(12) United States Patent
Delis et al.

(10) Patent No.: US 8,639,051 B2
(45) Date of Patent: Jan. 28, 2014

(54) METHOD FOR THE PREDICTION AND RESPECTIVELY DETERMINATION OF THE COLLECTION ON A STAMPING PART

(75) Inventors: Andreas Delis, Zurich (CH); Gilbert Fuerer, BE (CH); Marc Schneeberger, Kallnach (CH)

(73) Assignee: Feintool Intellectual Property AG, Lyss (CH)

( * ) Notice: Subject to any disclaimer, the term of this patent is extended or adjusted under 35 U.S.C. 154(b) by 168 days.

(21) Appl. No.: 13/211,041

(22) Filed: Aug. 16, 2011

(65) Prior Publication Data

US 2012/0045125 A1    Feb. 23, 2012

(30) Foreign Application Priority Data

Aug. 17, 2010   (EP) .................................... 10008559

(51) Int. Cl.
*G06K 9/44* (2006.01)
*G06K 9/00* (2006.01)

(52) U.S. Cl.
USPC .......................................................... 382/264

(58) Field of Classification Search
USPC ......... 382/162, 164, 167, 173, 181, 199, 254, 382/260–266, 276–277; 700/134
See application file for complete search history.

(56) References Cited

U.S. PATENT DOCUMENTS

| | | | |
|---|---|---|---|
| 5,663,885 A * | 9/1997 | Stahl ............................. | 700/134 |
| 6,035,242 A | 3/2000 | Uemura et al. | |
| 6,353,768 B1 | 3/2002 | Karafillis et al. | |
| 6,785,640 B1 | 8/2004 | Lu et al. | |
| 6,839,463 B1 * | 1/2005 | Blake et al. ................... | 382/173 |
| 2012/0045125 A1 * | 2/2012 | Delis et al. .................... | 382/167 |

FOREIGN PATENT DOCUMENTS

| | | |
|---|---|---|
| DE | 10 2006 047 806 | 4/2008 |
| DE | 10 2007 039 337 | 12/2008 |
| EP | 0 923 755 | 6/1999 |
| EP | 4 420 977 | 4/2013 |

* cited by examiner

*Primary Examiner* — Amir Alavi

(74) *Attorney, Agent, or Firm* — Jordan and Hamburg LLP

(57) ABSTRACT

Rollover for a part generated by virtual fine blanking is predicted and determined prior to producing the part. A digital image, in particular the cutting contour of the part, is generated, provided as an image file and subjected to image analysis in an image processing device. The image analysis provides individual color gradations of the cutting contour. The gradations are associated with a residual thickness in the region of the cutting contour, so as to be indicative of rollover.

9 Claims, 6 Drawing Sheets

METHOD FOR THE PREDICTION AND RESPECTIVELY DETERMINATION OF THE COLLECTION ON A STAMPING PART

BACKGROUND OF THE INVENTION

The invention relates to a method for predicting and/or determining the rollover for a part generated by virtual fine blanking, in which a digital image, in particular the cutting contour of the part, is generated, provided as an image file and subjected to image analysis in an image processing device.

Typical characteristics of fine blanked parts are edge rollover and burr. Rollover develops in particular in corner areas and increases as the corner radius decreases and the sheet metal thickness increases. The rollover depth can amount to approximately 20%, and the rollover width to 30%, of the sheet metal thickness, or more (see DIN 3345, Fine blanking, August 1980). This rollover is thus dependent on the material thickness and quality and can therefore be controlled only to a limited extent, often resulting in impairment of the function of parts, for example due to the resulting change in the functional length of the parts.

Rollover during blanking thus negatively impacts the function of the part and forces the manufacturer to use a thicker starting material.

According to the prior art, information regarding the rollover for part geometries produced by stamping or fine blanking is based on a combination of experimentation and empirical data from cutting and metal-forming processes. The prior art lacks a system for reliably predicting rollover.

Because, at present, the height of the stamping rollover can only be predicted in very vague terms prior to producing the actual parts, the first choice is always a solution involving a starting sheet metal thickness that is relatively high. This notably results in high material consumption and additionally requires greater metal forming forces, whereby, in turn, tooling wear rises.

Known solutions for simulating cutting and metal-forming processes generally employ the finite element method (see DE 10 2006 047 806 A1, DE 10 2007 039 337 B3, EP 923 755 B1, U.S. Pat. No. 6,353,768 B1, U.S. Pat. No. 6,785,640 B1). The drawback of these known solutions is that they are time-consuming, computationally demanding, costly and difficult to apply.

SUMMARY OF THE INVENTION

Considering the prior art, it is the object of the invention to provide a method for predicting and/or determining the rollover for a virtual part, wherein the method allows for reliable prediction of the rollover prior to producing the part, thus eliminating complex virtual and real experiments while also avoiding complex computing demands, saving material, and lowering tooling wear by designing the tools in a way that is better adapted to the requirements of the cutting and metal-forming processes.

This object is achieved by a method of the type discussed hereinbelow.

The solution according to the invention is based on the realization that the sheet metal thickness resulting after cutting can be determined in all regions by means of an image processing process including blurring of the contour of a cutting geometry, which takes the mechanical properties of the cut material into consideration, without having to produce actual parts or conduct complex finite element simulations.

This is achieved by the following steps:

a) coloring the points located inside the surface area defined by the cutting contour and the points located outside of the cutting contour using different colors that can be distinguished from one another;

b) carrying out at least a one-time blurring process on the cutting contour of the part using a filter that is calibrated for the material of the part and the ductility thereof so as to generate different color gradation values;

c) renewed coloring of the colored points located outside of the cutting contour using the original color prior to coloring;

d) processing the color gradation values to form a measure of the residual thickness on the cutting contour of the part after fine blanking in comparison with the starting thickness of the part prior to fine blanking; and e) determining the rollover based on the individual color gradations on the cutting contour by associating a residual thickness in the region of the cutting contour.

It is particularly advantageous that the rollover for the actual part can be predicted with high accuracy.

It thus becomes possible to gain information on the rollover within a very short time, which significantly increases reliability in the design of part geometry or fine blanking operations. Moreover, the information gained in this way can be used as input for simulating subsequent processes, which improves the accuracy of the simulation.

In a preferred embodiment, a Gaussian filter and/or a Laplace filter are employed for the method according to the invention, which blur the cutting contour by means of gradual blending using various gray scales that correspond to the relative sheet metal thickness in comparison with the original sheet metal thickness.

The filter can further be defined by a polynomial in the form of $$f(x) = \sum_{i=0}^{n} c_i x^{2i}.$$

In a further embodiment of the method according to the invention, blurring is designed as an iterative process, which is to say multifold, preferably 2 to 15 fold, filtration of the image. Materials having low ductility, which is to say material properties such as tensile strength, yield point and elongation at fracture, require a considerably lower number of filtration processes than materials having higher ductility.

In particular, Gaussian filters having a large radius of influence are suited for executing the method according to the invention on materials having high ductility, while materials having low ductility require Gaussian filters that have a low radius of influence.

Depending on the level of ductility of the material, the proportion of the colors, which are preferably black and white, in the color gradations is weighted so that one color, for example black, is given greater weighting for low ductility and the other color, for example white, is given greater weighting for high ductility.

The method according to the invention can be used to predict and/or determine the rollover on a stamping or a fine blanked part in all regions of the cutting contour, without having to produce actual parts, carry out experiments or conduct complex finite element simulations. This results in greater reliability in the design of part geometries and ultimately in a reduced starting material thickness.

Additional advantages and details will be apparent from the following description with reference to the accompanying drawings.

DETAILED DESCRIPTION OF THE INVENTION

Figure 1:
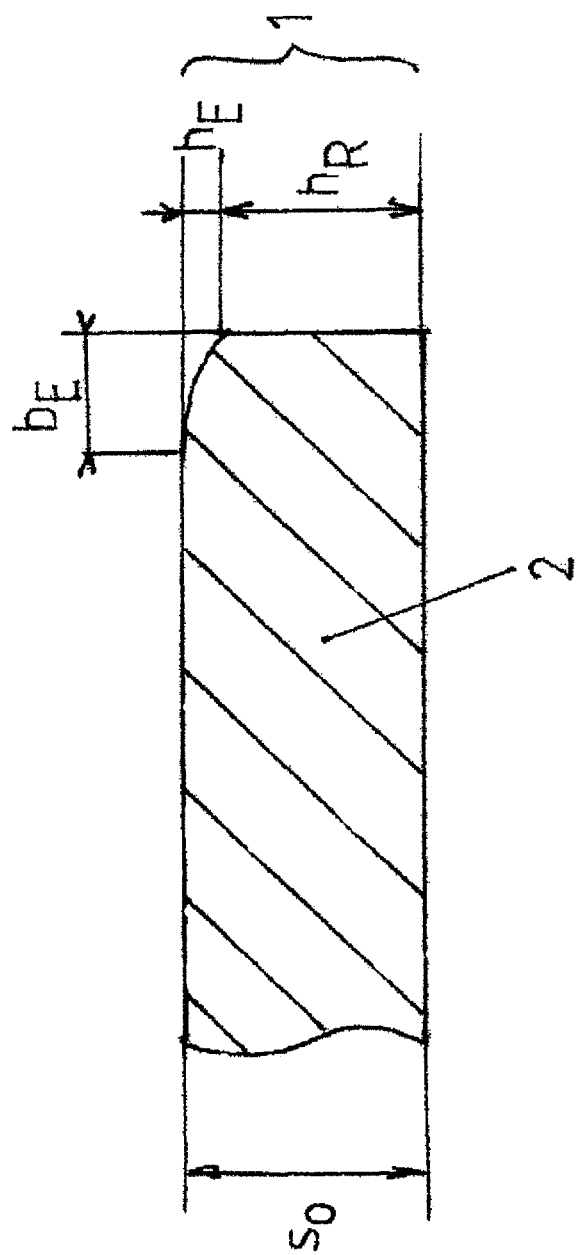
FIG. 1 shows a sectional view in the region of the cutting edge of a fine blanked part, including the rollover.

FIG. 1 shows a schematic view of a cut surface 1 on a part 2 having a starting sheet metal thickness $S_o$, the surface being generated by fine blanking. After fine blanking, rollover $h_E$ having a rollover width $b_E$ develops at the cut surface 1. The residual thickness $h_R$ determines the percentage bearing area of the remaining functional surface, via which the forces or torque are transmitted, for example on a gear wheel.

The residual thickness $h_R$ is calculated as follows:

$$h_R = S_0 - h_E \geq s_{crit},$$

where $s_{crit}$ denotes the minimum required residual thickness;

the starting sheet metal thickness $s_0$ must meet the condition $$S_0 \geq s_{crit} + h_E.$$

Rollover is always at the maximum where the length of the cutting contour in relation to the supporting surface area is high. In other words, the rollover of a point increases as the supporting material in the surroundings decreases. In the example of fine toothing, this means that the tooth tip has very large rollover and the tooth base has almost no rollover.

The method according to the invention is to be used to predict the rollover $h_E$ for a gear wheel 3 comprising sheet steel, with the geometric data of the gear wheel, such as the starting sheet metal thickness $s_0$, the number of teeth and the ductility of the steel, being known.

Figure 2:
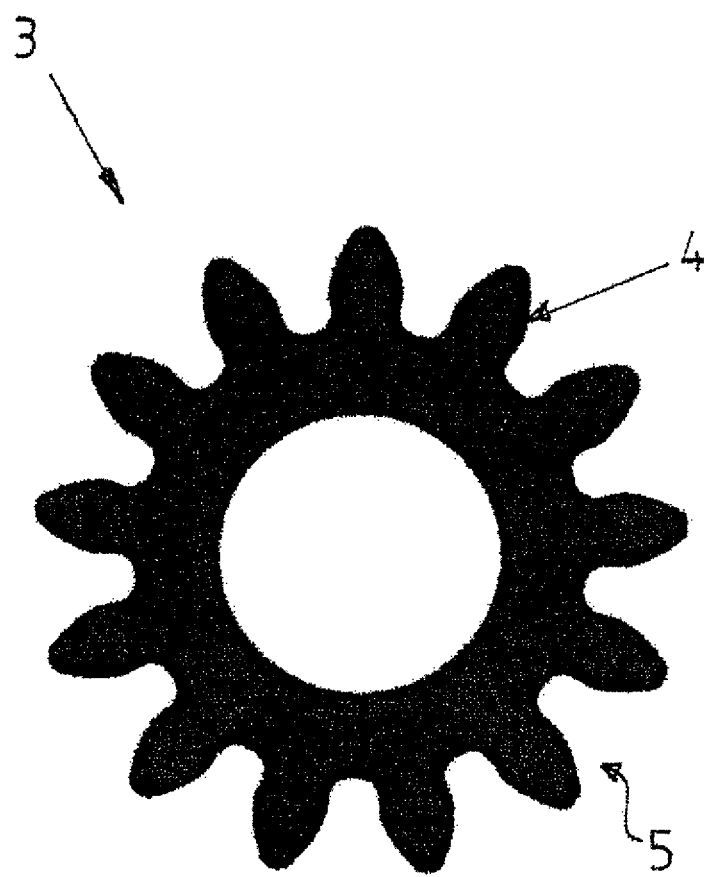
FIG. 2 is a top view of a part contour of a gear wheel, the inner contour of which was filled in black.

The method according to the invention will be explained in more detail with reference to FIGS. 2 to 4.

First, the cutting contour 4 of the gear wheel 3 is generated by an appropriate program, for example CAD, in the form of a two-dimensional digital image 5, wherein points inside the surface area defined by the cutting contour are colored in black and points outside of this surface area are colored in white. It is also possible, of course, to use other colors instead of black and white, for example blue and red, or green and yellow, or the like. The image 5 is then saved in a memory of an image processing device. This state is shown in FIG. 2. However, the invention also encompasses generation of the digital image by optical means, such as a CCD camera or a scanner.

Subsequently, the image 5 is manipulated using an optical filter, preferably a Gaussian filter, by subjecting the cutting contour 4 of the image 5 to a blurring process. The blurring process gives the cutting contour gradual blending, with various gray scale values, to the blackened interior surface area of the gear wheel geometry. If a different color combination is selected, the color gradations will be analogous.

The Gaussian averaging function weights the surroundings of a point (mean value 0) in accordance with the Gaussian distribution as follows:

$$f(x, y) = \frac{1}{2\pi\sigma^2} \cdot e^{-\frac{1}{2}\left(\frac{x^2+y^2}{\sigma^2}\right)}$$

where f(x,y) denotes the Gaussian function having the coordinates x, y for a two-dimensional area and $\sigma^2$ denotes the variance, which is to say the steepness of the bell-shaped curve.

Gaussian blurs take the values of adjacent cells into consideration and replace the value of the presently analyzed cell with a new value, which takes the surroundings based on a Gaussian distribution into consideration.

Figure 3:
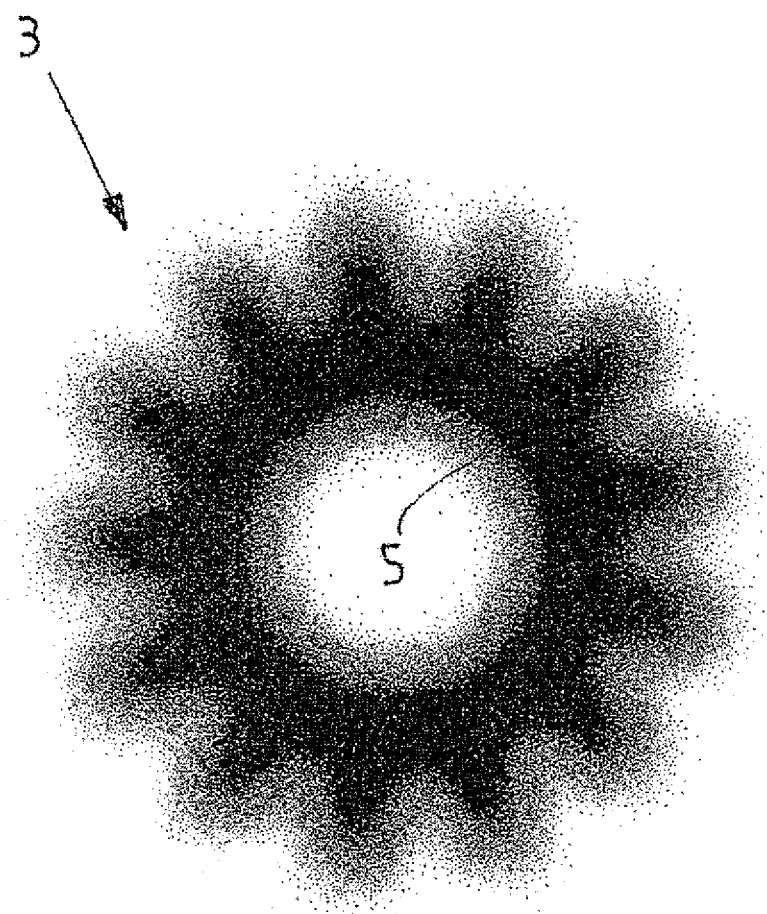
FIG. 3 is a top view of a cutting contour of a gear wheel that has been blurred using a Gaussian filter.

FIG. 3 shows the cutting contour of the gear wheel 3 after it has been blurred by a Gaussian filter.

For gray scale values generated to correspond to the relative sheet metal thickness, which is to say the residual thickness $h_R$, the Gaussian filter must be calibrated or conditioned.

The calibration of the Gaussian filter takes the mechanical properties of the material into consideration as follows:

| Material | Low ductility | High ductility |
| --- | --- | --- |
| Radius of the Gaussian filter | Small radius | Large radius |
| Number of iterations | Low | High |
| Black and white weighting | Greater weighting of black | Greater weighting of white |

Over the further course of the method according to the invention, the gray scale values are processed in the image analysis to form a measure of the residual thickness $h_R$ along the cutting contour of the gear wheel 3 after fine blanking in comparison with the starting sheet metal thickness prior to fine blanking.

Figure 4:
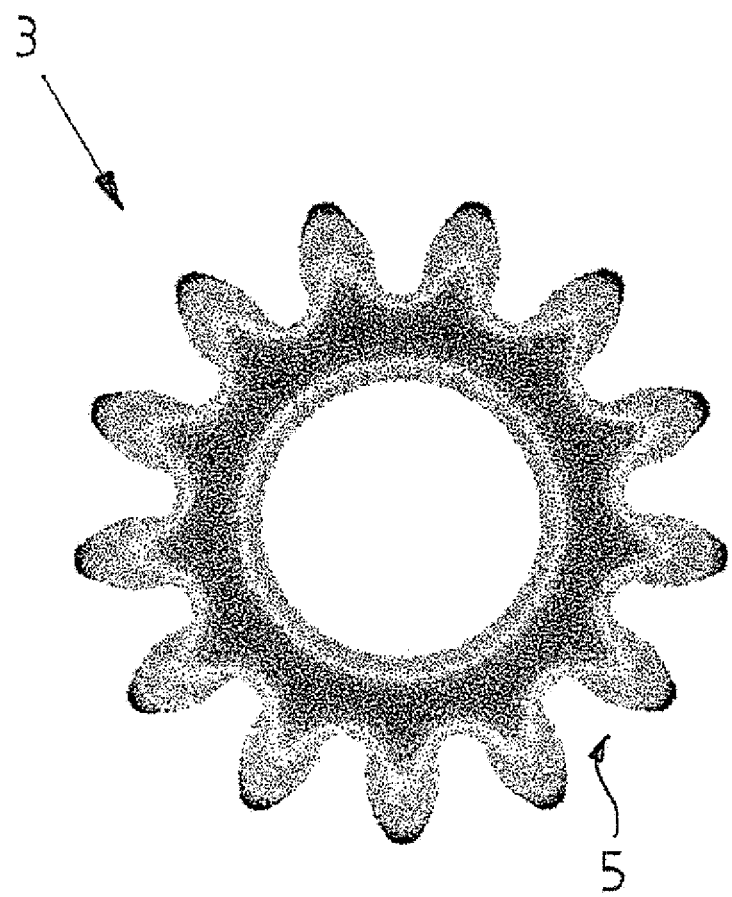
FIG. 4 is a top view of a blurred part contour of a gear wheel, the gray scale values of which were each associated with a sheet metal thickness.

This state is shown in FIG. 4.

The individual gray scale values on the cutting contour are associated with the respective sheet metal thicknesses. This is done by saving reference signatures for gray scale values in the memory of the image processing device. The reference signatures are marked by characteristic sheet metal thicknesses.

Figure 5:
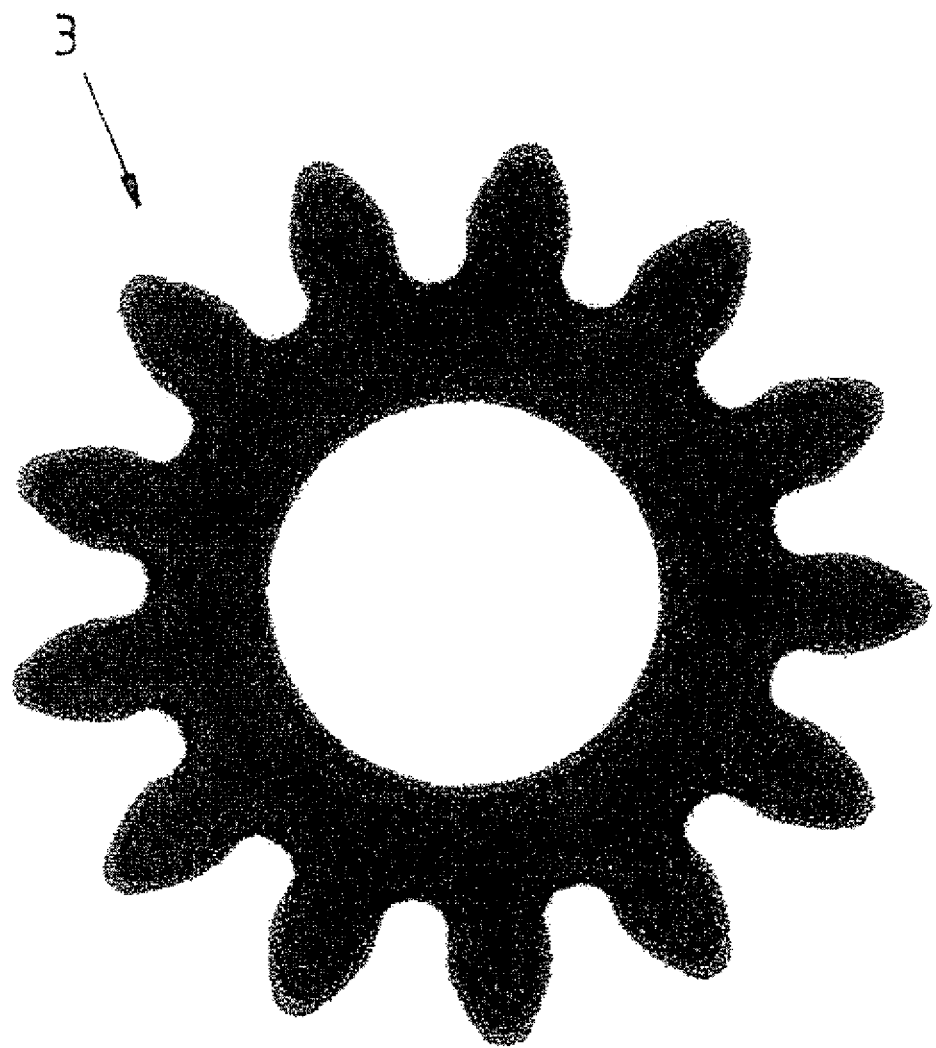
FIG. 5 is a top view of a part contour of a gear wheel comprising a material having low ductility.

FIG. 5 shows an example of an image of a gear wheel 3 comprising S550MC material having low ductility, which was manipulated six times by a Gaussian filter having a radius of $\sigma=10$. The weighting factor w between black and white was 1. The result basically predicts low rollover, with concave curvatures having lower rollover as compared to convex curvatures.

Figure 6:
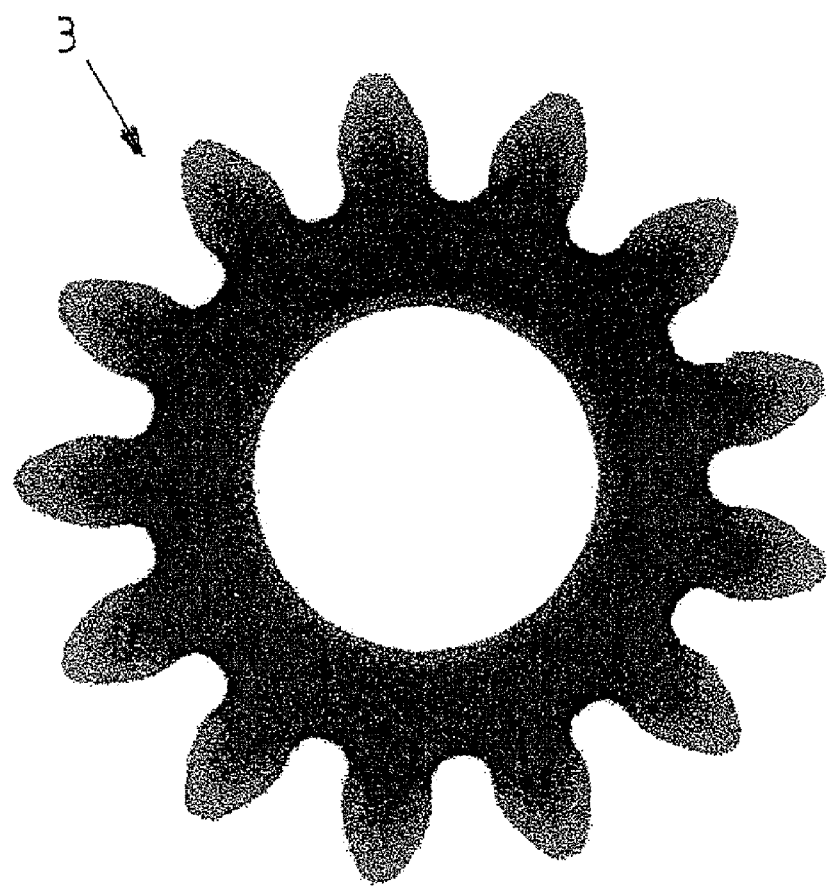
FIG. 6 is a part contour of a gear wheel comprising a material having high ductility.

In contrast, FIG. 6 shows an example of an image of a gear wheel 3 comprising DC04 material having high ductility, which was manipulated eight times by a Gaussian filter having a radius $\sigma=20$. The weighting factor w between black and white was 1. This basically results in greater rollover, notably on convex curvatures.

The invention claimed is:

1. A method for predicting and/or determining rollover for a part generated by virtual fine blanking, in which a digital image of a cutting contour of the part is generated, provided as an image file and subjected to image analysis in an image processing device, comprising:

a) coloring points located inside a surface area defined by the cutting contour and points located outside of the cutting contour using colors that can be distinguished from one another;

b) carrying out at least a one-time blurring process on the cutting contour of the part using a filter that is calibrated for a material of the part and a ductility thereof so as to generate different color gradation values;

c) renewing coloring of the colored points located outside of the cutting contour using the original color used for the first coloring;

d) processing the color gradation values to form a measure of a residual thickness on the cutting contour of the part after fine blanking in comparison with a starting thickness of the part prior to fine blanking; and e) determining the rollover based on the individual color gradations on the cutting contour by associating the gradations with a residual thickness in the region of the cutting contour.

2. The method according to claim 1, wherein, black is used to color the points inside the cutting contour and white is used to color the points located outside of the cutting contour.

3. The method according to claim 1, wherein, gray scaling is used to obtain the color gradation values.

4. The method according to claim 1, wherein, the filter is calibrated according to a function of a shape of the cutting contour, a cutting edge geometry, a sheet metal thickness, material properties including tensile strength, yield point and elongation at fracture, clearance between the elements of a tool involved in the cutting operation including a blanking die and plunger, selection of a basis function with corresponding parameters, the number of iterations, and the weighting of black and white in gray scales used to obtain the color gradation values.

5. The method according to claim 4, wherein, the cutting contour comprises a concave and/or convex shape.

6. The method according to claim 1, wherein, a Gaussian filter and/or a Laplace filter or a filter having a corresponding symmetric polynomial function comprises the filter for blurring the cutting contour.

7. The method according to claim 1, wherein, the blurring is carried out as an iterative process of passing the filter over the image in the range of 2 to 15 times.

8. The method according to claim 1, wherein, a Gaussian filter having various standard deviations comprises the filter for blurring.

9. The method according to claim 1, wherein, the digital image of the cutting contour is generated by a program and/or an optical means including a CCD camera or scanner.

\* \* \* \* \*